United States Patent
Guo et al.

(10) Patent No.: US 11,196,268 B2
(45) Date of Patent: Dec. 7, 2021

(54) METHOD FOR GENERATING DATA DIAGRAM AND METHOD FOR MANAGING BATTERY PACK

(71) Applicant: Tsinghua University, Beijing (CN)

(72) Inventors: Dong-Xu Guo, Beijing (CN); Xu-Ning Feng, Beijing (CN); Yue-Jiu Zheng, Beijing (CN); Xue-Bing Han, Beijing (CN); Lan-Guang Lu, Beijing (CN); Ming-Gao Ouyang, Beijing (CN); Xiang-Ming He, Beijing (CN); Geng Yang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 149 days.

(21) Appl. No.: 16/558,260

(22) Filed: Sep. 2, 2019

(65) Prior Publication Data

US 2020/0350771 A1     Nov. 5, 2020

(30) Foreign Application Priority Data

Apr. 30, 2019     (CN) .......................... 201910362410.3

(51) Int. Cl.
*H02J 7/00*     (2006.01)

(52) U.S. Cl.
CPC .......... *H02J 7/0016* (2013.01); *H02J 7/0021* (2013.01)

(58) Field of Classification Search
CPC ........... H02J 7/0016; H02J 7/00; H02J 7/0021
See application file for complete search history.

(56) References Cited

U.S. PATENT DOCUMENTS

| | | | |
|---|---|---|---|
| 5,686,895 A * | 11/1997 | Nakai | B60L 53/14 340/636.1 |
| 2012/0290234 A1* | 11/2012 | Schaefer | B60L 58/12 702/63 |
| 2019/0113577 A1* | 4/2019 | Severson | G01R 31/392 |

* cited by examiner

*Primary Examiner* — Robert Grant

(57) ABSTRACT

A method for generating a data diagram is provided, including: obtaining a first data of each cell in a battery pack during a charge and discharge cycle of the battery pack; calculating a rated capacity and a dischargeable electric quantity of each cell based upon the data obtained; and generating a first data diagram for every cell of the battery pack based upon the rated capacity and the dischargeable electric quantity of each cell. A method for managing the battery pack based on the data diagram is further provided.

11 Claims, 8 Drawing Sheets

METHOD FOR GENERATING DATA DIAGRAM AND METHOD FOR MANAGING BATTERY PACK

CROSS-REFERENCE TO RELATED APPLICATIONS

This application claims all benefits accruing under 35 U.S.C. § 119 from Chinese Patent Application No. 201910362410.3 filed on Apr. 30, 2019 in the National Intellectual Property Administration of China, the contents of which are incorporated by reference herein.

FIELD

The present disclosure relates to battery management, and in particular to methods for generating data diagrams and methods for managing battery packs.

BACKGROUND

Lithium ion cells, with lower self discharge rate, wider operating temperature range (for example, from about −25° C. to about 50° C.), no memory effect, longer cycle life, and less pollution, are favorable for electrochemical energy storage systems, such as a power supplying system of an electric vehicle. As a single cell has limited voltage and capacity, cells are assembled together to form a battery pack thereby meeting the power or energy output requirements of the electrochemical energy storage systems. However, inconsistency always exists among the cells undermining an efficiency of energy utilization of the battery pack. As a consequence, a cell balancing or equalization is always required for the battery pack.

Conventionally, a strategy for the cell balancing or equalization of the battery pack is determined based on a terminal voltage of each cell or a state of charge (SOC) of each cell. However, the changes of terminal voltage and the SOC of each cell will be nonlinear along with the aging of the battery pack, which would cause the strategy inaccurate and thus influence the balancing effect.

SUMMARY

A method for generating a data diagram is provided, including: obtaining a first data of each cell in a battery pack during a charge and discharge cycle of the battery pack; calculating a rated capacity and a dischargeable electric quantity of each cell based upon the data obtained; and generating a first data diagram for every cells of the battery pack based upon the rated capacity and the dischargeable electric quantity of each cell.

In one embodiment, the first data is obtained before the battery pack being used for a period of time, and the method for generating the data diagram further includes: using the battery pack for the period of time; obtaining a second data of each cell in the battery pack after the battery pack being used for the period of time; and generating a second data diagram based on the first data diagram and the second data of each cell.

A method for managing a battery pack is further provided, including: obtaining a first data of each cell in a battery pack during a charge and discharge cycle of the battery pack, the first data is obtained before the battery pack being used for a period of time; calculating a rated capacity and a dischargeable electric quantity of each cell based upon the first data obtained; generating a first data diagram for every cells of the battery pack based upon the rated capacity and the dischargeable electric quantity of each cell; using the battery pack for the period of time, obtaining a second data of each cell in the battery pack after the battery pack being used for the period of time, and generating a second data diagram based on the first data diagram and the second data of each cell; determining a balancing strategy and processing the second data diagram according to the balancing strategy to generate a strategy diagram; and balancing the battery pack based on the strategy diagram.

The data diagram provided by the present disclosure has dynamic linearity, which is favorable for management design of the battery pack. The method for managing the battery pack in the present disclosure can provide a strategy of optimal balancing based upon the data diagram, thereby controlling the cell electrochemical performance in the battery pack more accurately.

BRIEF DESCRIPTION OF THE DRAWINGS

Implementations are described by way of example only with reference to the attached figures.

DETAILED DESCRIPTION

A detailed description with the above drawings is made to further illustrate the present disclosure.

A method for generating a data diagram and a method for managing a battery pack are provided in the present disclosure. The methods can be applied to a variety of fields and scenes, for example, to a battery pack, such as a lithium ion battery pack. The methods can be executed by a variety of execution components or devices, such as a battery testing device or a processor in the battery testing device.

Figure 1:
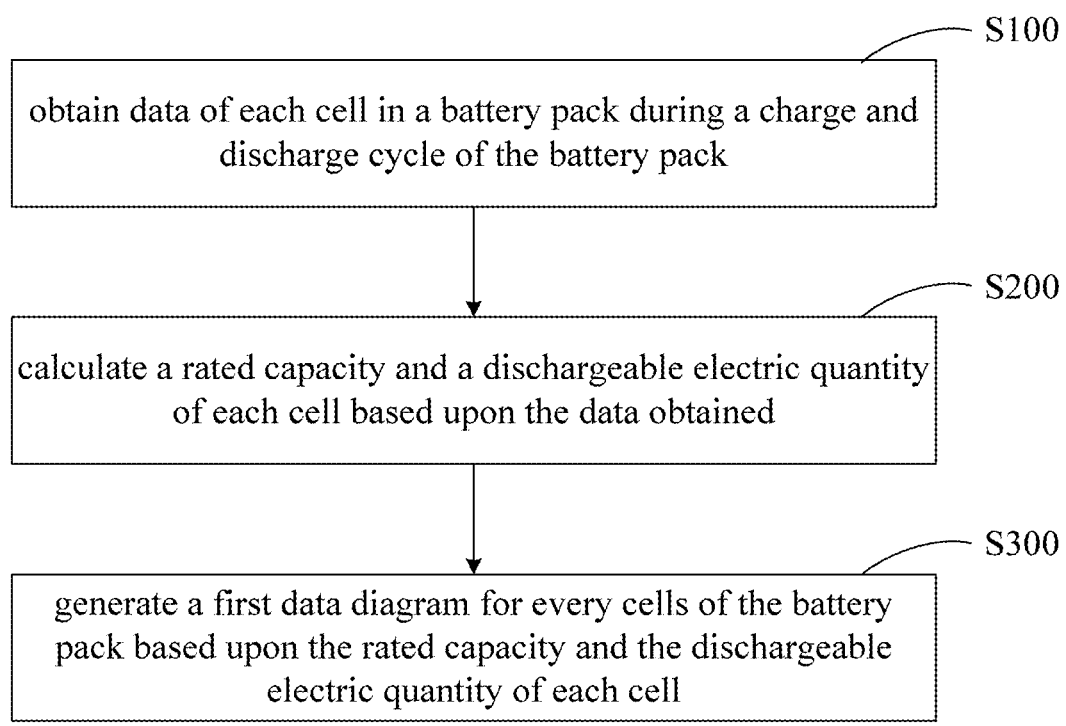
FIG. 1 shows a flowchart of an embodiment of a method for generating a data diagram.

Referring to FIG. 1, an embodiment of the method for generating the data diagram includes:

S100, obtaining data of each cell in a battery pack during a charge and discharge cycle of the battery pack;

S200, calculating a rated capacity and a dischargeable electric quantity of each cell based upon the data obtained;

S300, generating a first data diagram for every cells of the battery pack based upon the rated capacity and the dischargeable electric quantity of each cell.

The battery pack can include a plurality of cells connected in series. At least two (for example, ten) cells can be provided in the battery pack. In an embodiment, the cells can be lithium ion cells. In an embodiment, the cells can be unused cells. Each cell can be electrically connected to one sensor, the sensor real-timely collecting cell data during cycling of the battery pack. The cell data collected can then be transmitted to a processor after the cycling of the battery pack. Each cell can have its own rated capacity and its own dischargeable electric quantity which can be calculable from the date obtained in the S100.

The first data diagram can be a table or a graph. In an embodiment, the data diagram is a 2D graph, with the rated capacity as its x-axis and the dischargeable electric quantity as its y-axis. A coordinate point defined by the rated capacity and the dischargeable electric quantity of each cell can be drawn as a scattered dot in the graph.

Figure 2:
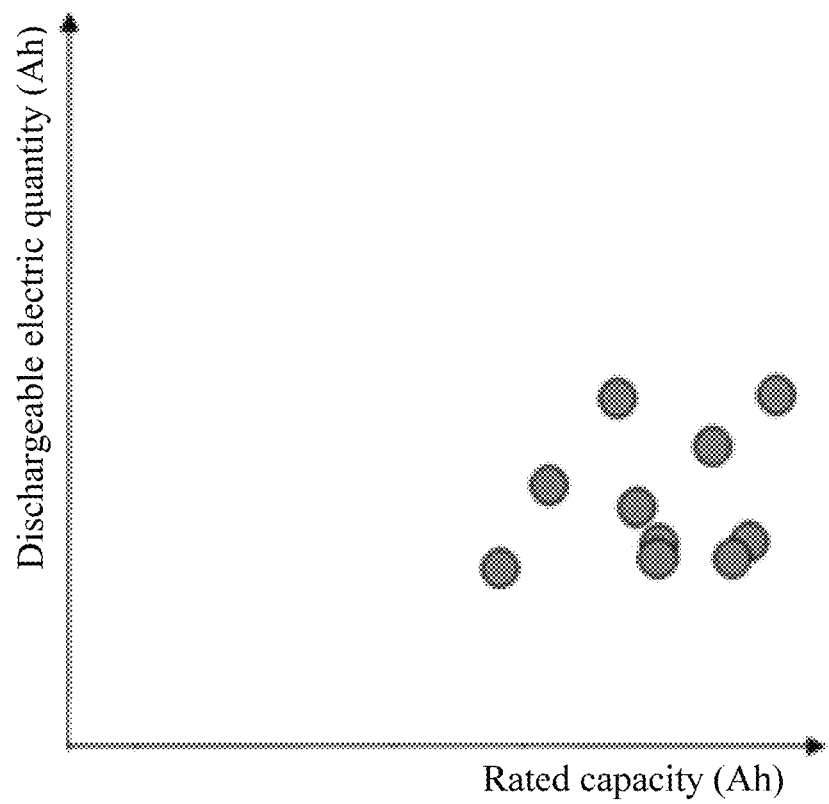
FIG. 2 shows a schematic first data diagram generated by an embodiment of the method for generating the data diagram.

FIG. 2 shows a schematic first data diagram generated by an embodiment of the method for a battery pack, in which each coordinate point represents one cell. An x-axis value of the coordinate point represents the rated capacity of the cell, and a y-axis value of the coordinate point represents the dischargeable electric quantity of the cell.

Figure 3:
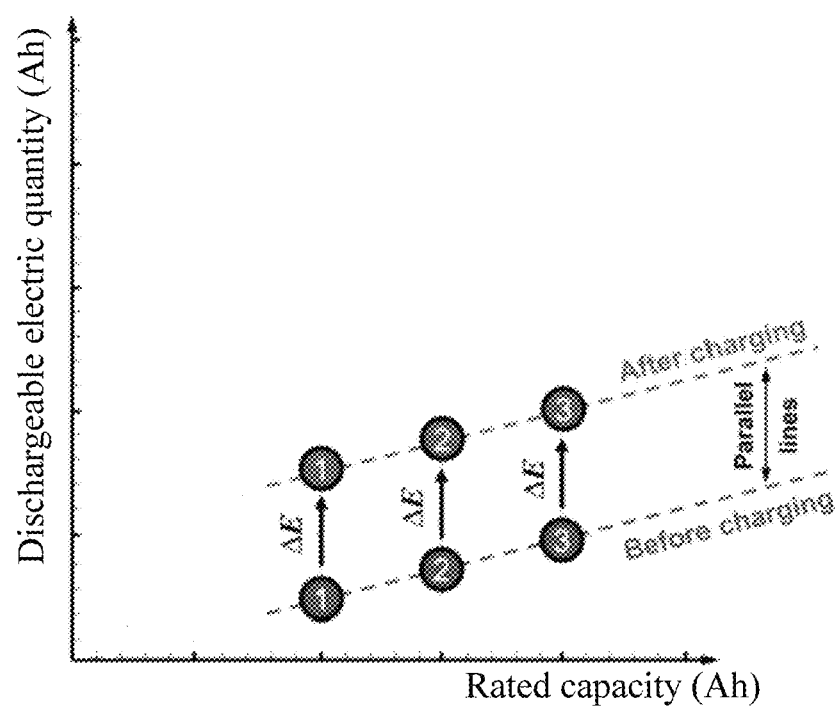
FIG. 3 demonstrates a dynamic linearity of the data diagram.

The first data diagram has a good character of dynamic linearity that the relative position of coordinate points of different cells in one battery pack under current load will not change. A schematic data diagram shown in FIG. 3 is used to demonstrate the dynamic linearity, wherein three dots represents there coordinates points of three cells in one battery pack, respectively. The relative position of the three dots corresponding to the three cells will not change before and after charging, because the increment of electric quantity is the same for the three cells connected in series. Correspondingly, the movement of the three dots corresponding to the three cells during discharging is also linear. Such a dynamic linearity can be utilized for management design of the battery pack.

In an embodiment, the S100 can include:

S110, collecting charging time data and discharging time data of each cell during one charge and discharge cycle of the battery pack.

The data of each cell can include the charging time data and the discharging time data in one charge and discharge cycle of the battery pack. The charging time data of each cell can be collected by the corresponding sensor during charging. The discharging time data of each cell can be collected by the corresponding sensor during discharging. The charging time data and the discharging time data of each cell can be configured to reflect the state of each cell so as to provide basis for generating the first data diagram.

In an embodiment, the S110 can include:

S112, charging the battery pack with a constant charge current $I^C$ from a zero time point, and recording a time point $T_i^C$ when a terminal voltage of each cell reaches to a voltage limit for charge (VLC) until terminal voltages of all cells reach to the VLC, wherein i corresponding to a reference number for each cell (for example, i can be a positive integer), and recording an earliest time point $T_i^C$ as $T_{min}^C$;

S114, after terminal voltages of all cells reach to the VLC, terminating the charge and resting the battery pack for a pre-set time period; and S116, after the pre-set time period, discharging the battery pack with a constant discharge current $I^D$, and recording a time point $T_i^D$ when the terminal voltage of each cell reaches to a voltage limit for discharge (VLD) until terminal voltages of all cells reach to the VLD, and recording an earliest time point $T_i^D$ as $T_{min}^D$.

A VLC for one cell refers to a voltage at which this cell reaches a full-charge state. A VLD for one cell refers to a voltage at which this cell reaches the full-discharge state. The cells in one battery pack usually have different voltages at a same charge/discharge time point due to the cell variations. During charging, when a terminal voltage of a cell having a highest real-time voltage ($cell_{max\ V}$) reaches its VLC, if the battery pack is continually charged, then the $cell_{max\ V}$ that has been already fully charged will be over charged, which may cause an overheating and degradation of the cell. Thus, a full-charge state of the battery pack generally is the full-charge state of the $cell_{max\ V}$. The $T_{min}^C$ refers to the time point when the terminal voltage of the $cell_{max\ V}$ reaches the VLC and is the moment when the battery pack reaches the full-charge state. During the remaining charging after the $T_{min}^C$, the battery pack is in an over-charge state. The terminal voltage of one cell is increasing along with the charging even if this cell has been fully charged. Therefore, when the terminal voltage of a cell having the lowest real-time voltage ($cell_{min\ V}$) in the battery pack reaches the VLC, the terminal voltages of other cells has exceeded the VLC and their values are different as originally exhibited.

Correspondingly, during discharging, when the terminal voltage of $cell_{min\ V}$ reaches its VLD, if the battery pack is continually discharged, then the $cell_{min\ V}$ that has been already fully discharged will be over discharged, which may cause a reduced longevity of the cell. Thus, a full-discharge state of the battery pack generally is the full-discharge state of the $cell_{min\ V}$. The $T_{min}^D$ refers to the time point when the terminal voltage of the $cell_{min\ V}$ reaches the VLD and is the moment when the battery pack reaches the full-discharge state. During the remaining discharging after the $T_{min}^D$, the battery pack is in an over-discharge state. The terminal voltage of one cell is decreasing along with the discharging even if this cell has been fully discharged. Therefore, when the terminal voltage of $cell_{max\ V}$ reaches the VLD, the terminal voltages of other cells has exceeded the VLD and their values are different as originally exhibited.

In the present embodiment, the data of cells are collected during charging and discharging the battery pack slightly over. Because the cell variances are unusually small in the battery pack, charging or discharging the cell slightly over just one or a few times has little influence on the cell degradation and longevity.

It should be noted that the time points when the terminal voltages of the cells in the battery pack reaches the VLC or VLD are generally different due to the cell variations. The $T_i^C$ and the $T_i^D$ can reflect the state of each cell. The $T_{min}^C$ and the $T_{min}^D$ can reflect the state of the battery pack. The battery pack is sequentially subjected to charge, over charge, resting, discharge, and over discharge to collect the charging time data and discharging time data of each cell, which provides basis for generating the data diagram.

The terminal voltage of each cell refers to a voltage at one of two terminals of respective cell. The terminal voltage of each cell can be detected by the sensor of respective cell. The $I^C$, $I^D$, VLC, and VLD can be predetermined. In an embodiment, the $I^C$ can be in a range from about ⅓ C (charge rate) to about 1 C. In one embodiment, the $I^D$ can be in a range from about ⅓ C to about 1 C. In an embodiment, $I^C$ is equal to $I^D$. In an embodiment, the $I^C$ and the $I^D$ can both be ⅓ C, the $V_{lim}^C$ can be 4.2 V, and the $V_{lim}^D$ can be 2.75 V.

Resting the battery pack means that the battery pack is neither charged nor discharged and the current flow either from (discharge) or to (charge) the battery pack may be negligible. The battery pack will become gradually stable during resting, which is favorable for obtaining accurate data in the subsequent discharge. The pre-set time period can be any suitable time period, for example, about 1 hour or above 1 hour.

In an embodiment, the S200 can include:

S210, calculating the rated capacity $Q_i$ of each cell according to the following equation I:

$$Q_i = \int_{T_i{}^D}^{T_i{}^D} I_D dt \qquad \text{I}$$

S220, calculating a chargeable electric quantity difference $E_i{}^C$ of each cell according to the following equation II:

$$E_i{}^C = \int_{T_{min}{}^C}^{T_i{}^C} I^C dt \qquad \text{II; and}$$

S230, calculating the dischargeable electric quantity $E_i{}^D$ of each cell according to the following equation III:

$$E_i{}^D = Q_i - E_i{}^C \qquad \text{III}$$

When the battery pack is in the full-charge state, most of the cells have not been fully charged at that moment yet. The chargeable electric quantity difference $E_i{}^C$ of one cell refers to an electric quantity charged from the time point when the battery pack reaches the full-charge state (i.e. $T_{min}{}^C$) to the time point when this cell reaches the full-charge state (i.e. $T_i{}^C$). The dischargeable electric quantity $E_i{}^D$ of one cell refers to a dischargeable electric quantity of this cell when the battery pack reaches the full-charge state.

In the present embodiment, the rated capacity and the dischargeable electric quantity of each cell are calculated according to the collected charging time data and discharging time data so as to determine the corresponding relationship between the rated capacity and the dischargeable electric quantity of each cell and generate the first data diagram.

Figure 4:
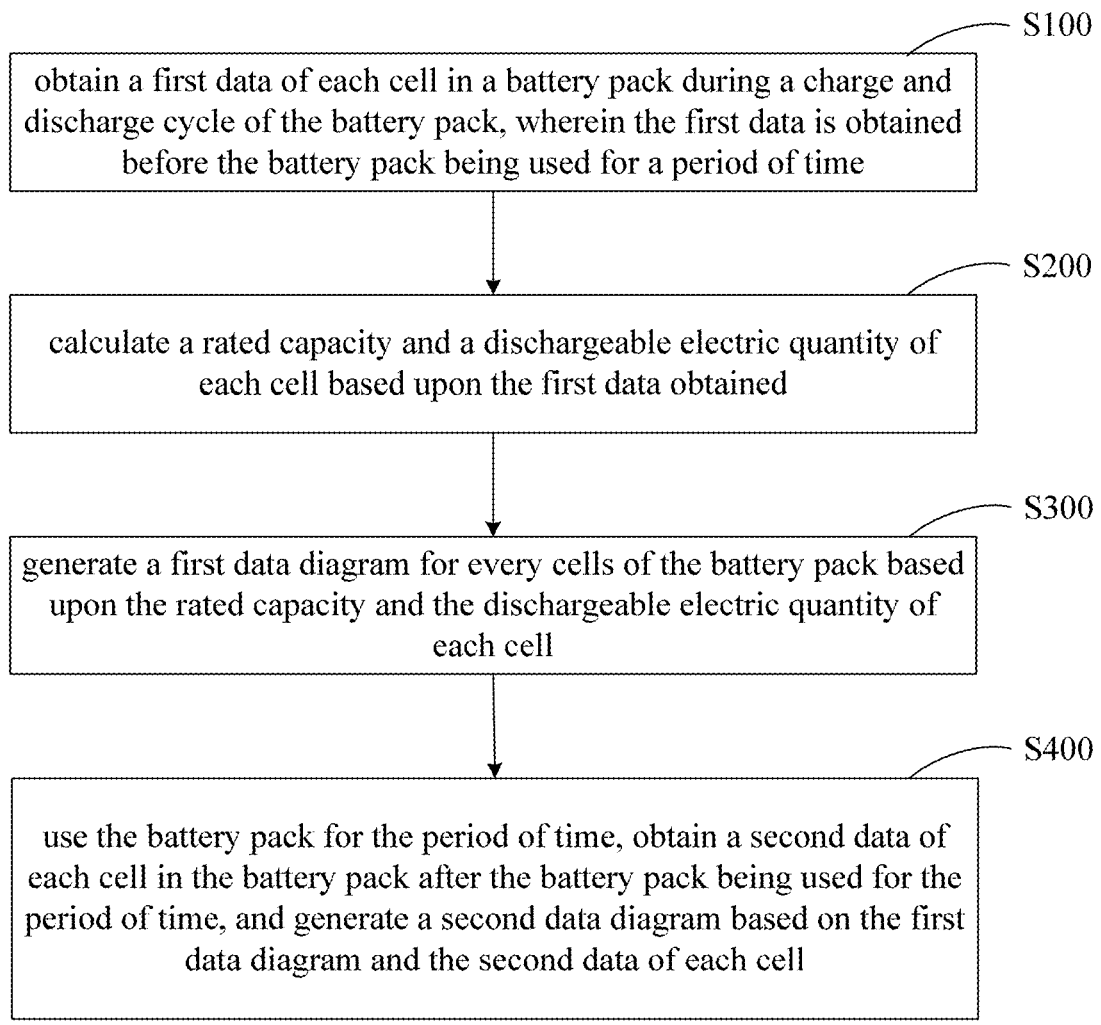
FIG. 4 shows a flowchart of another embodiment of the method for generating the data diagram.

Referring to FIG. 4, another embodiment of the method for generating the data diagram includes:

S100, obtaining a first data of each cell in a battery pack during a charge and discharge cycle of the battery pack, the first data is obtained before the battery pack being used for a period of time;

S200, calculating a rated capacity and a dischargeable electric quantity of each cell based upon the first data obtained;

S300, generating a first data diagram for every cells of the battery pack based upon the rated capacity and the dischargeable electric quantity of each cell;

S400, using the battery pack for the period of time, obtaining a second data of each cell in the battery pack after the battery pack being used for the period of time, and generating a second data diagram based on the first data diagram and the second data of each cell.

The S100, S200, and S300 of this embodiment are substantially the same as the S100, S200, and S300 of the above embodiment, respectively, and will not be repeated herein.

The cells in the battery pack in the S100 may be unused before, and a performance and data of each cell may be changed with the use of the battery pack (for example, in an electric car), so it is necessary to update the first data diagram to obtain a real-time status of each cell in the battery pack. The second data diagram can reflect the real-time status of each cell in the battery pack, so that a strategy for managing the battery pack can be adjusted accordingly. The period of time can be a preset value. By updating the data diagram based upon real-time data of each cell, the management strategy of the battery pack can be designed more accurately. The second data can include an open circuit voltage of each cell and a state of charge $SOC_i$ of each cell corresponding to the open circuit voltage.

In an embodiment, the S400 can include:

S410, obtaining an open circuit voltage of each cell in the battery pack;

S420, obtaining a state of charge $SOC_i$ of each cell based upon the open circuit voltage obtained;

S430, obtaining the rated capacity $Q_i$ of each cell from the first data diagram;

S440, calculating a real dischargeable electric quantity $E_i{}^R$ of each cell based upon the state of charge $SOC_i$ and the rated capacity $Q_i$ of each cell according to the following equation IV:

$$E_i{}^R = Q_i \times SOC_i \qquad \text{IV; and}$$

S450, generating the second data diagram based upon the rated capacity $Q_i$ and the real dischargeable electric quantity $E_i{}^R$ of each cell.

In an embodiment of the S410, the open circuit voltage of each cell can be obtained by measuring a terminal voltage of each cell immediately after the battery pack has been rested for at least 1 hour. A terminal voltage of a cell is substantially the same as an open circuit voltage of the cell when the cell is in a stable state. Since the battery pack will become gradually stable during resting, the open circuit voltage of each cell can be obtained by measuring the terminal voltage of each cell after a long time resting.

In the S420, the state of charge $SOC_i$ of each cell can be obtained by querying from a user manual provided by a cell manufacturer according to the open circuit voltage obtained. A relationship of the state of charge and the open circuit voltage of the cell is generally recorded in the user manual.

In the S430, since the rated capacity of a cell is substantially constant during the lifetime of the cell, the rated capacity $Q_i$ of each cell used to generate the first data diagram can also be used to generate the second data diagram.

In the S440, the real dischargeable electric quantity $E_i{}^R$ of each cell can be calculated based upon the $SOC_i$ of each cell. It should be noted that the real dischargeable electric quantity $E_i{}^R$ of each cell can also be obtained by other ways.

Figure 5:
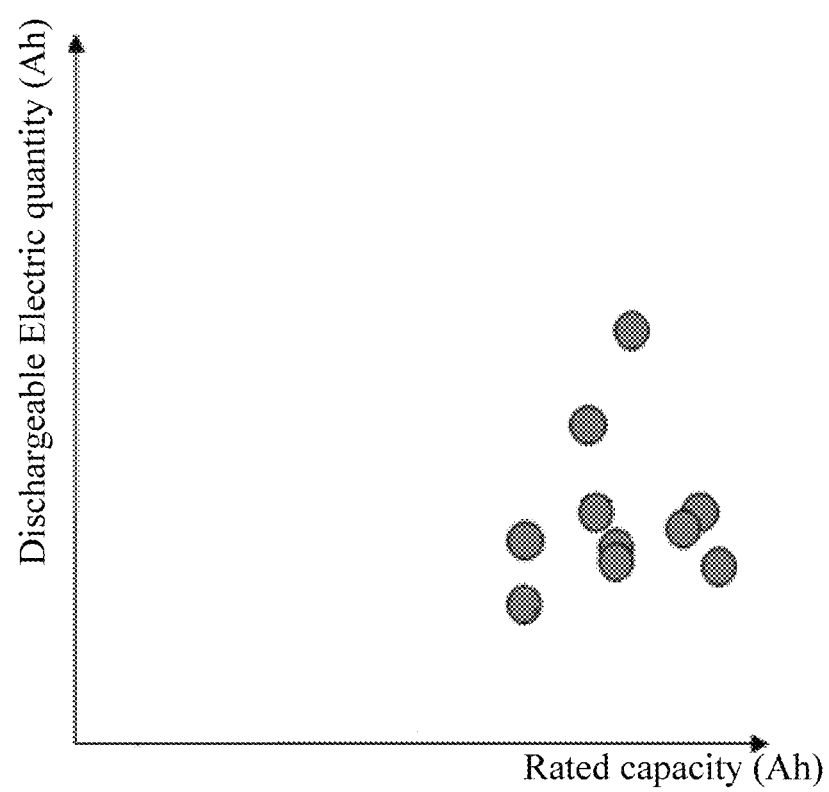
FIG. 5 shows a schematic second data diagram generated by an embodiment of the method for generating the data diagram.

In the S450, referring to FIG. 5 which shows a schematic second data diagram generated by the method of an embodiment of the present disclosure, it can be seen that locations of coordinate points of the cells are changed compared to the FIG. 2 after using the period of time, reflecting the real-time status of each cell. The first data diagram and the second data diagram can each be 2D graph with scattered dots.

The data diagram of the battery pack of the present embodiment can be updated to reflect the real time status of each cell, which allows the user to adjust the strategy of managing the battery pack according to the real time state of each cell.

Figure 6:
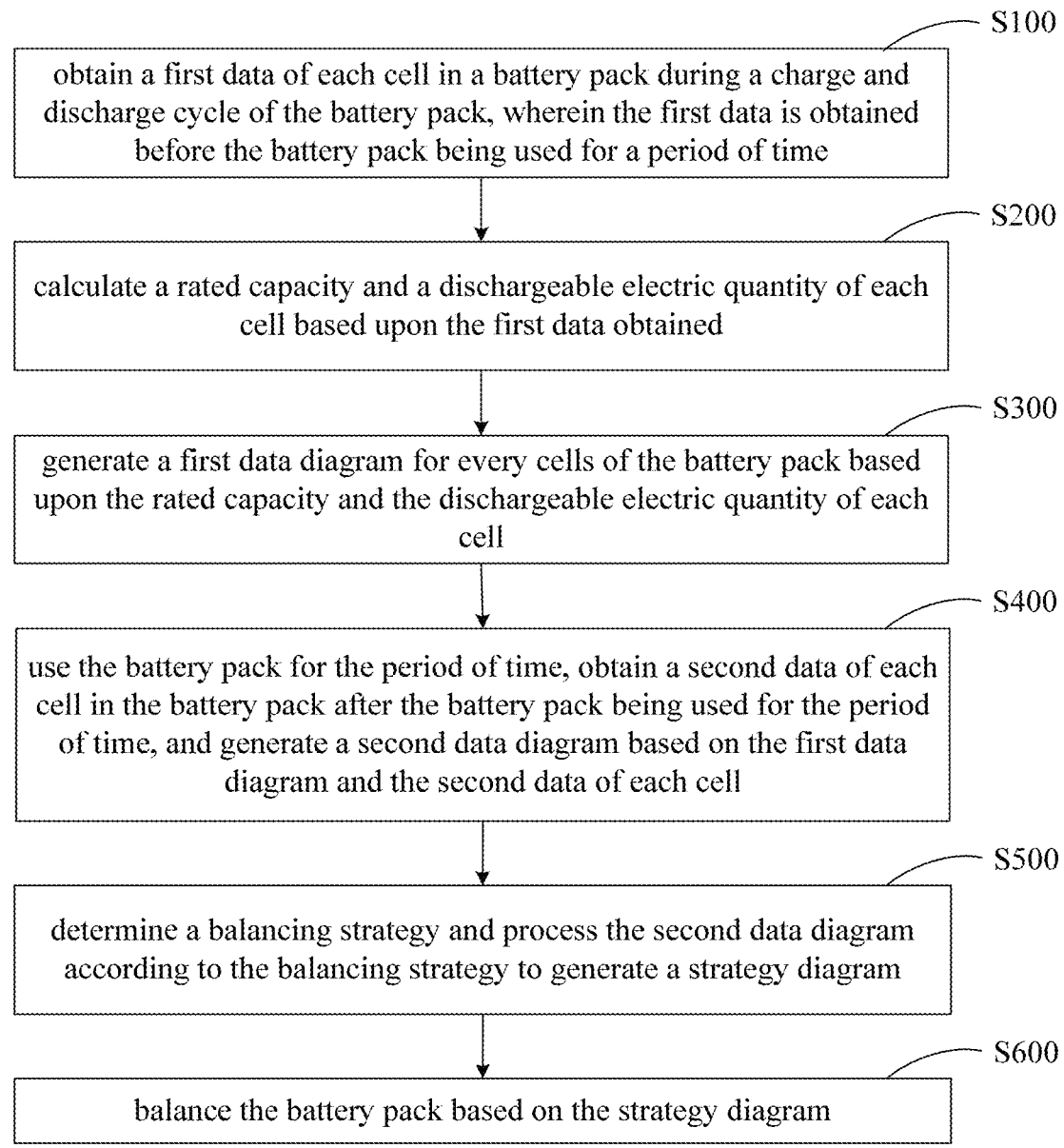
FIG. 6 shows a flowchart of an embodiment of a method for managing a battery pack.

Referring to FIG. 6, an embodiment a method for managing a battery pack, includes:

S100, obtaining a first data of each cell in a battery pack during a charge and discharge cycle of the battery pack, the first data is obtained before the battery pack being used for a period of time;

S200, calculating a rated capacity and a dischargeable electric quantity of each cell based upon the first data obtained;

S300, generating a first data diagram for every cells of the battery pack based upon the rated capacity and the dischargeable electric quantity of each cell;

S400, using the battery pack for the period of time, obtaining a second data of each cell in the battery pack after the battery pack being used for the period of time, and generating a second data diagram based on the first data diagram and the second data of each cell;

S500, determining a balancing strategy and processing the second data diagram according to the balancing strategy to generate a strategy diagram; and S600, balancing the battery pack based on the strategy diagram.

The S100, S200, S300, and S400 in the method for managing the battery pack are substantially the same as those in the method for generating the data diagram and will not be repeated again.

In the S500, the balancing strategy can be selected from an active balancing and a passive balancing. In the active balancing, the energy, for example, the electric quantity, is drawn from higher electric quantity cells and transferred to lower electric quantity cells. In the passive balancing, the energy, for example, the electric quantity, is drawn from higher electric quantity cells and dissipated as heat, usually through resistors until the voltage or charge matches the voltage on the lower electric quantity cell.

In an embodiment, the processing the second data diagram according to the balancing strategy to generate the strategy diagram of the S500 can include:

S510, determining a key cell according to the balancing strategy; and

S520, drawing a balancing line in the second data diagram based upon the key cell to generate the strategy diagram.

The key cell can be regarded as a balancing target for all cells in the battery pack. The key cell can be an imaginary cell. In an ideal situation, the state of each cell can be substantially the same as that of the key cell after balancing. The balancing line can be a balancing target line. In an ideal situation, the coordinate point corresponding to each cell should be located on the balancing target line after balancing.

In an embodiment, the balancing strategy can be the active balancing. The energy can be transferred from higher electric quantity cells to lower electric quantity cells by a control device and an energy storage device. The control device can be an insulated gate bipolar transistor (IGBT) or a metal oxide semiconductor field effect transistor (MOSFET). The energy storage device can be an inductor or a capacitor.

In the active balancing, the key cell can have a rated capacity equal to an average of rated capacities of all cells in the battery pack. The key cell can have a dischargeable electric quantity equal to an average of dischargeable electric quantities of all cells in the battery pack. The rated capacity $Q_K$ of the key cell can be calculated according to an equation V-I:

$$Q_K = \frac{1}{N}\sum_{i=1}^{N} Q_i \quad \text{V-I}$$

wherein N denotes a number of the cells in the battery pack. The dischargeable electric quantity of the key cell can be calculated by a similar way with the $Q_K$.

Figure 7:
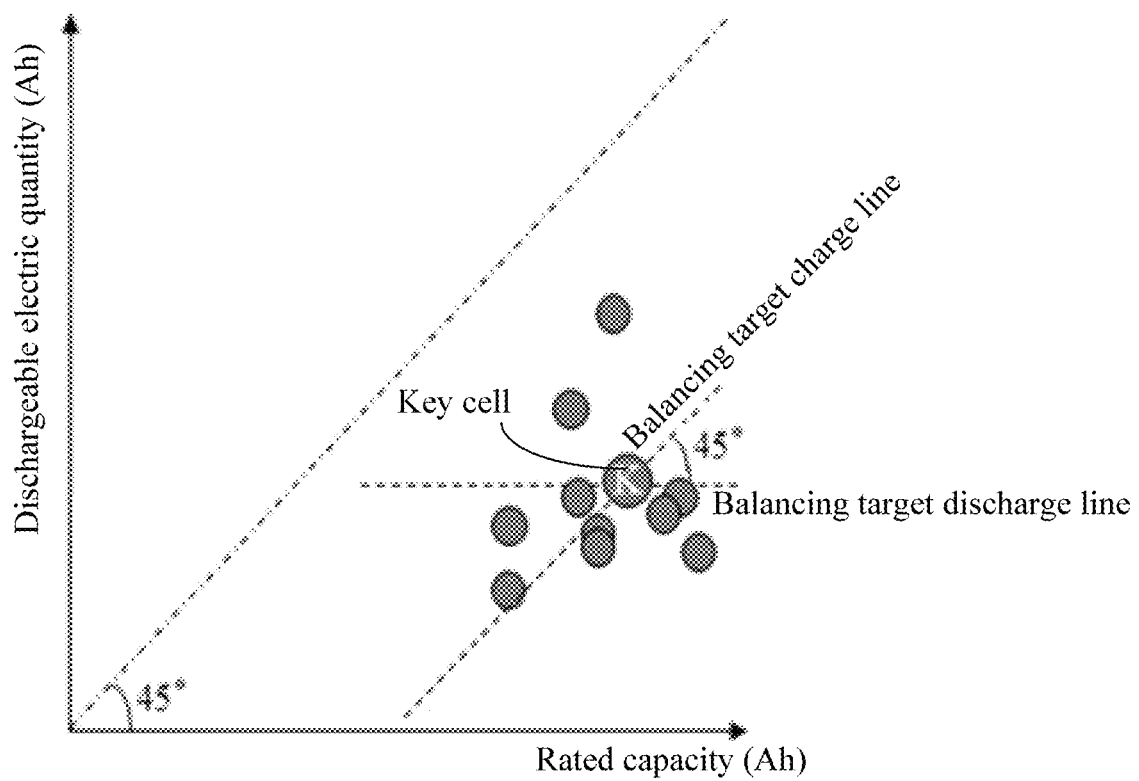
FIG. 7 shows a strategy diagram for active balancing provided by an embodiment of method for managing the battery pack.

In the active balancing, the balancing line can include a balancing target charge line and a balancing target discharge line. During charging, in an ideal situation, all the cells are expected to be fully charged (in the full charge state, and the dischargeable electric quantity of one cell is expected to be equal to the rated capacity of this cell) together. Therefore, referring to FIG. 7, the balancing target charge line can have about a 45° intersection angle with the x-axis and pass a coordinate point of the key cell. Similarly, during discharging, in an ideal situation, all the cells are expected to be fully discharged. Therefore, referring to FIG. 6, the balancing target discharge line can be in parallel with the x-axis and pass the coordinate point of the key cell.

In another embodiment, the balancing strategy can be the passive balancing. The key cell can have a rated capacity equal to a lowest rated capacity among the cells in the battery pack. The key cell can further have a discharge electric quantity equal to a lowest discharge electric quantity among the cells in the battery pack to achieve the maximum usage of the pack capacity.

Figure 8:
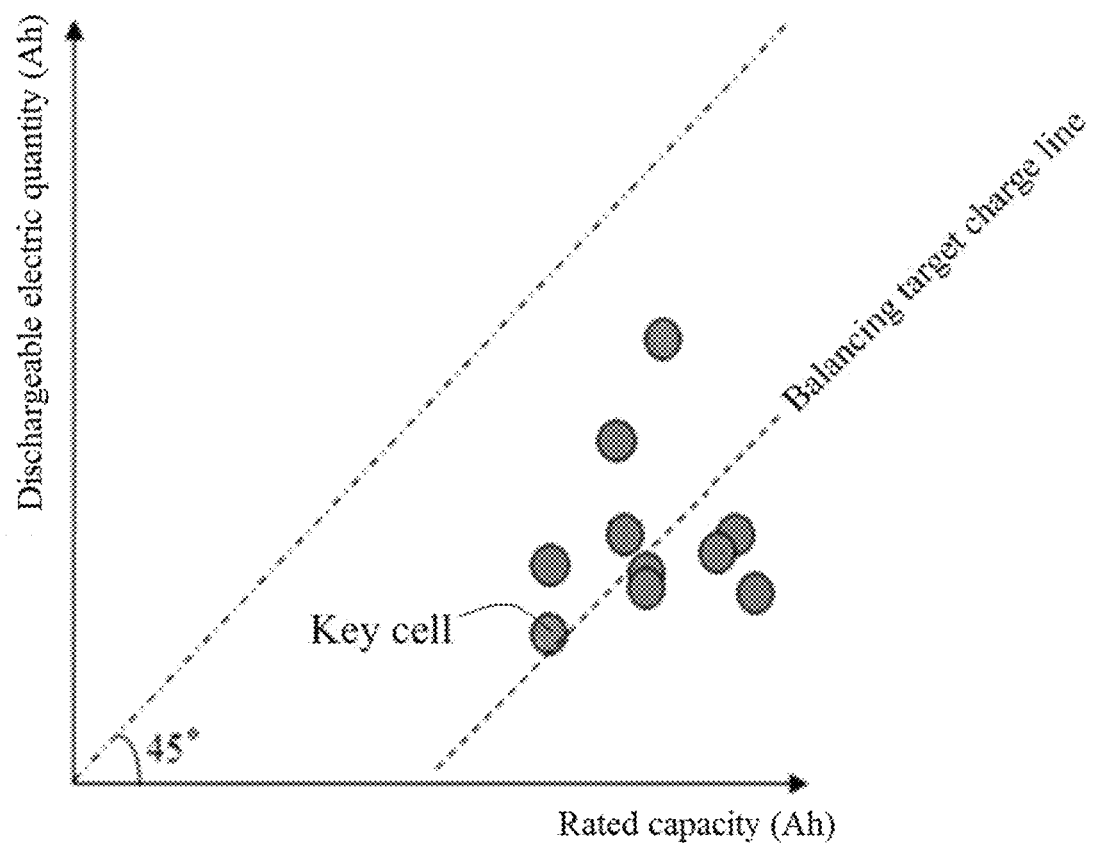
FIG. 8 shows a strategy diagram for passive balancing provided by an embodiment of method for managing the battery pack.

In the passive balancing, the balancing line can include a balancing target charge line. Referring to FIG. 8, the balancing target charge line can have about a 45° intersection angle with the x-axis and pass a dot corresponding to the key cell.

In an embodiment, the S600 can further include:

S610, defining a region to be balanced by the balancing line in the strategy diagram and balancing the battery pack until the coordinate point of each cell within the region to be balanced reaches the balancing line.

For the active balancing, the coordinate point of each cell can be moved up and down. The S610 can include:

defining a region located above the balancing line as a discharge region and defining a region located below the balancing line as a charge region; and transferring energy from the cell located within the discharge region to the cell located within the charge region until the coordinate point of each cell in the battery pack reaches the balancing line.

For the passive balancing, the coordinate point of each cell can be only moved down. The S610 can include:

defining a region located above the balancing line as a discharge region; and discharging the cell located within the discharge region until the coordinate point of each cell within the discharge region reaches the balancing line.

The method for managing the battery pack in the present disclosure can provide a strategy of optimal balancing based upon the data diagram, thereby controlling the cell electrochemical performance in the battery pack more accurately.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for managing a battery pack, comprises:
obtaining a first data of each cell in a battery pack during a charge and discharge cycle of the battery pack, the first data is obtained before the battery pack is used for a period of time;
calculating a rated capacity and a dischargeable electric quantity of each cell based upon the first data obtained;
generating a first data diagram for every cells of the battery pack based upon the rated capacity and the dischargeable electric quantity of each cell;
using the battery pack for the period of time, obtaining a second data of each cell in the battery pack after the battery pack is used for the period of time, and generating a second data diagram based on the first data diagram and the second data of each cell;

determining a balancing strategy and processing the second data diagram according to the balancing strategy to generate a strategy diagram; and balancing the battery pack based on the strategy diagram;

wherein the first data diagram and the second data diagram are each a 2D graph, an x-axis of the 2D graph is the rated capacity, a y-axis of the 2D graph is the dischargeable electric quantity, and a coordinate point of each cell is drawn as a scattered dot in the 2D graph;

wherein the determining a balancing strategy and processing the second data diagram according to the balancing strategy to generate a strategy diagram comprises:

selecting the balancing strategy from a passive balancing and an active balancing;

determining a key cell according to the balancing strategy selected; and drawing a balancing line in the second data diagram based upon the key cell to generate the strategy diagram.

2. The method of claim 1, wherein the balancing the battery pack based on the strategy diagram comprises:

defining a region to be balanced by the balancing line in the strategy diagram; and balancing the battery pack until the coordinate point of each cell within the region reaches the balancing line.

3. The method of claim 1, wherein the balancing strategy is the active balancing strategy, a rated capacity of the key cell equals to an average of rated capacities of all cells in the battery pack, and a dischargeable electric quantity of the key cell equals to an average of dischargeable electric quantities of all cells in the battery pack;

the balancing target line comprises a balancing target charge line and a balancing target discharge line, the balancing target charge line passes a coordinate point of the key cell and has about a 45° intersection angle with the x-axis, and the balancing target discharge line passes the coordinate point of the key cell and is in parallel with the x-axis.

4. The method of claim 3, wherein the balancing the battery pack based on the strategy diagram comprises:

defining a region located above the balancing line as a discharge region and defining a region located below the balancing line as a charge region; and transferring energy from the cell located within the discharge region to the cell located within the charge region until the coordinate point of each cell in the battery pack reaches the balancing line.

5. The method of claim 1, wherein the balancing strategy is the passive balancing strategy, a rated capacity of the key cell equals to a lowest rated capacity among the cells in the battery pack, and a discharge electric quantity of the key cell equals to a lowest discharge electric quantity among the cells in the battery pack;

the balancing target line is a balancing target discharge line, the balancing target discharge line passes a coordinate point of the key cell and has about a 45° intersection angle with the x-axis.

6. The method of claim 5, wherein the balancing the battery pack based on the strategy diagram comprises:

defining a region located above the balancing line as a discharge region; and discharging the cell located within the discharge region until the coordinate point of each cell within the discharge region reaches the balancing line.

7. The method of claim 1, wherein the obtaining the first data of each cell comprises:

charging the battery pack with a constant charge current $I^C$ from a zero time point;

recording a time point $T_i^C$ when a terminal voltage of each cell reaches a voltage limit for charge until terminal voltages of all cells reach the voltage limit for charge, wherein i denotes a reference number for each cell, and recording an earliest time point $T_i^C$ as $T_{min}^C$;

discharging the battery pack with a constant discharge current $I^D$;

recording a time point $T_i^D$ when the terminal voltage of each cell reaches a voltage limit for discharge until terminal voltages of all cells reach to the voltage limit for discharge; and recording an earliest time point $T_i^D$ as $T_{min}^D$.

8. The method of claim 7, wherein between the charge and the discharge, the obtaining data of each cell further comprises:

after terminal voltages of all cells reach the voltage limit for charge, resting the battery pack for a pre-set time period.

9. The method of claim 7, wherein the rated capacity of each cell is calculated by an equation I:

$$Q_i = \int_{T_i^C}^{T_i^D} I^D dt \qquad \text{I}$$

wherein Qi denotes the rated capacity of each cell; and the dischargeable electric quantity of each cell is calculated by an equation I-I:

$$E_i^C = Q_i - \int_{T_{min}^C}^{T_i^C} I^C dt \qquad \text{I-I}$$

wherein $E_i^D$ denotes the dischargeable electric quantity of each cell.

10. The method of claim 1, wherein the obtaining a second data of each cell and the generating a second data diagram comprises:

obtaining an open circuit voltage of each cell in the battery pack;

obtaining a state of charge $SOC_i$ of each cell based upon the open circuit voltage obtained;

obtaining the rated capacity of each cell from the first data diagram;

calculating a real dischargeable electric quantity $E_i^R$ of each cell based upon the state of charge $SOC_i$ and the rated capacity $Q_i$ of each cell according to the following equation IV:

$$E_i^R = Q_i \times SOC_i \qquad \text{IV; and}$$

generating the second data diagram based upon the rated capacity $Q_i$ and the real dischargeable electric quantity $E_i^R$ of each cell.

11. The method of claim 10, wherein the open circuit voltage of each cell is obtained by measuring the terminal voltage of each cell after the battery pack has rested for at least 1 hour.

* * * * *